Jan. 18, 1944.　　　　R. F. WILSON　　　　2,339,548
BULLET-RESISTING TUBE
Filed Feb. 21, 1941　　　2 Sheets-Sheet 1
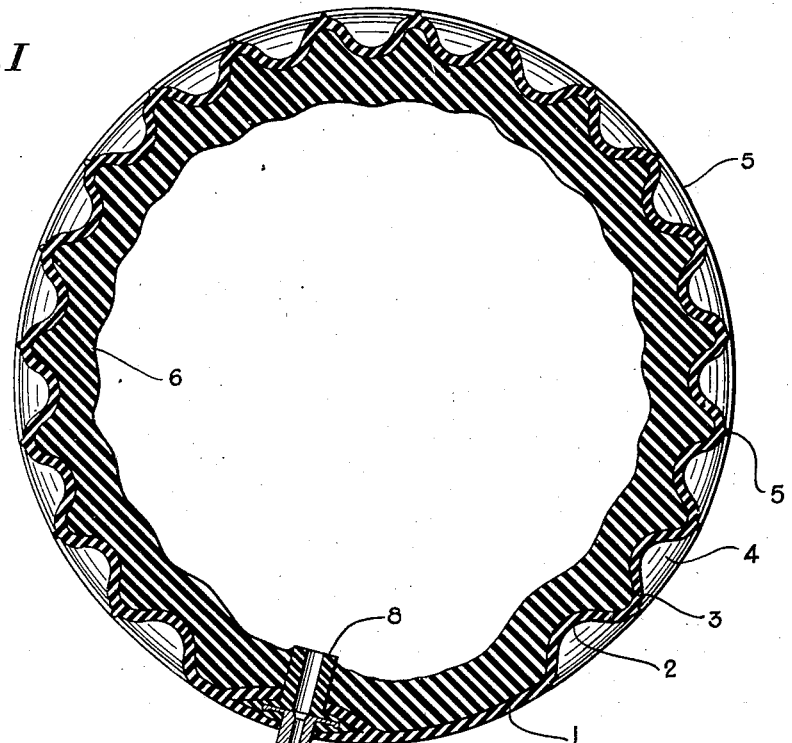
FIG. I
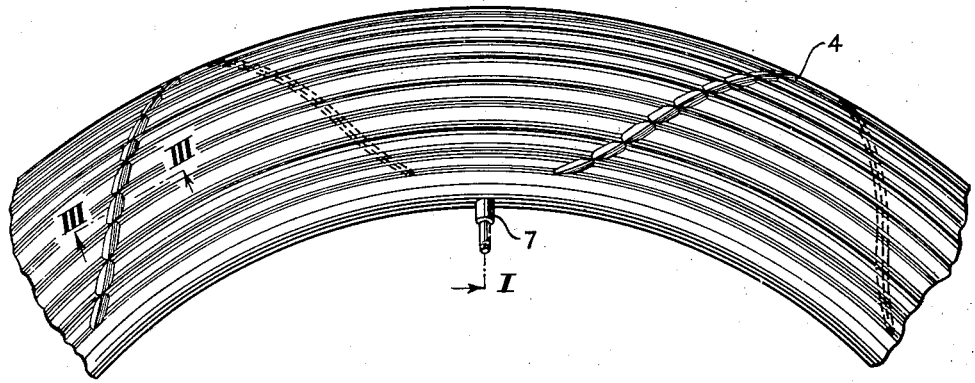
FIG. II
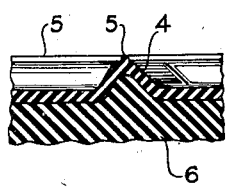
FIG. III
INVENTOR
ROBERT F. WILSON
BY
ATTORNEYS Jan. 18, 1944. R. F. WILSON 2,339,548
BULLET-RESISTING TUBE
Filed Feb. 21, 1941  2 Sheets-Sheet 2
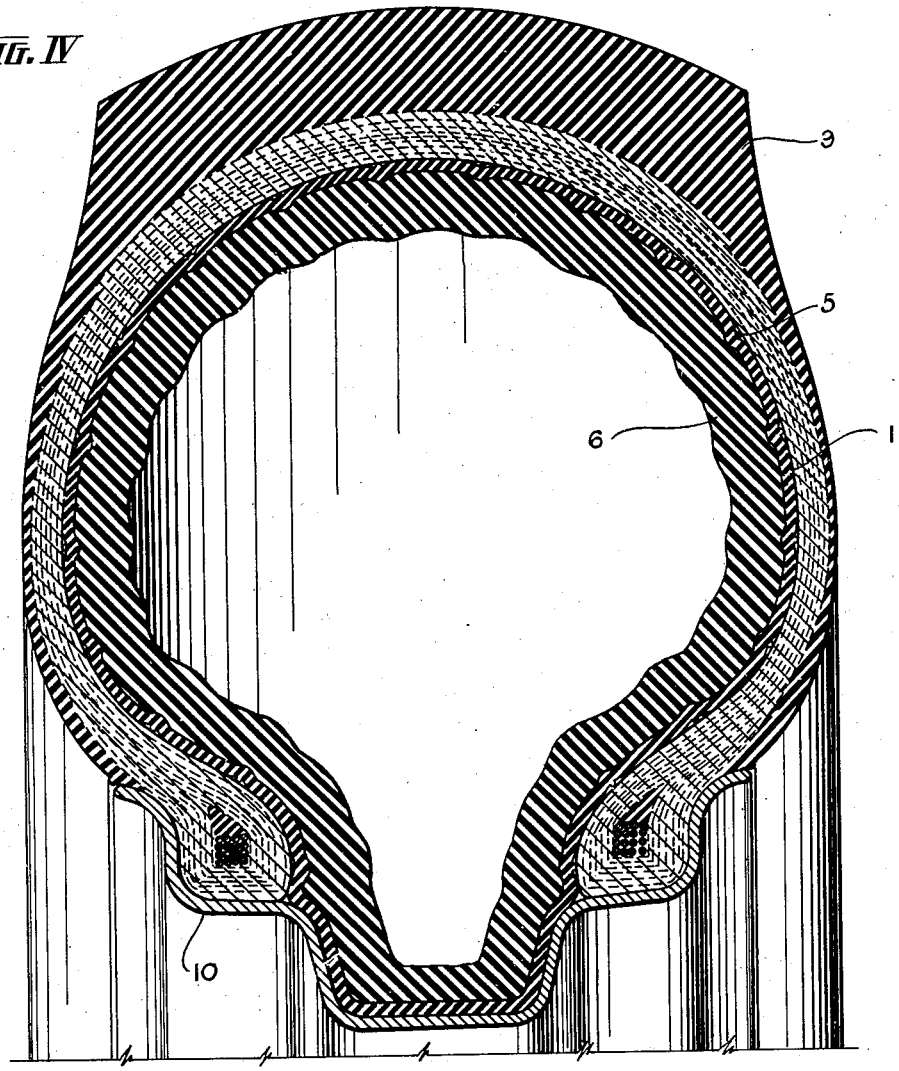
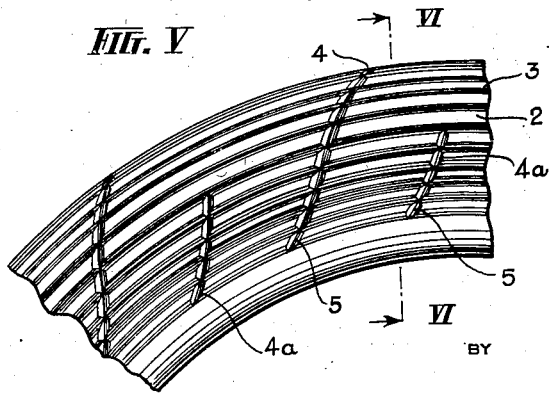
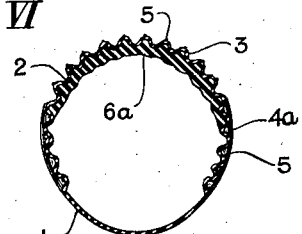
INVENTOR
ROBERT F. WILSON
BY
ATTORNEYS Patented Jan. 18, 1944

2,339,548

UNITED STATES PATENT OFFICE 2,339,548

BULLET-RESISTING TUBE

Robert F. Wilson, Akron, Ohio, assignor to The Firestone Tire & Rubber Company, Akron, Ohio, a corporation of Ohio Application February 21, 1941, Serial No. 379,975

4 Claims. (Cl. 152—346)

This invention relates to inner tubes, and more especially to puncture-sealing and bullet-resisting inner tubes for pneumatic tires or other inflatable bodies.

Heretofore, puncture-sealing inner tubes have included two classes, compression and self-healing. One type of compression tube, illustrated by United States Patent No. 1,429,015, carried a series of transverse corrugations in the tube wall, whereby inflation of the tube in a tire casing placed the said wall under compression. The compressed tube wall resisted the passage therethrough of a sharp object and squeezed shut any small hole caused by the insertion and withdrawal of a puncturing object. However, a tube having only transverse corrugations has been found to be ineffective in closing large holes made in the tube. This is in part due to the fact that the tube is placed under a transverse tension when inflated in a tire, and this tension counteracts the very slight compression effect derived from the transverse corrugations.

Another type of compression tube, shown in United States Patent No. 1,410,630, comprised circumferential corrugations for the same purpose of causing the tube wall to be placed under compression when the tube was inflated in a casing. A further modification, disclosed in United States Patent No. 1,120,916, comprised spiral corrugations in the tube wall for this purpose. None of these types of compression tube afforded appreciable protection against puncturing bullets or other large objects, and none completely sealed even small holes so as to prevent leakage of air from the punctured tube.

The self-healing class of tubes has relied upon the use of a gummy or plastic inner layer in the tube to seal any puncture hole made in the tube. Ordinarily, the plastic inner layer extended only beneath the tread portion of the tube. The plastic layer was often covered on the inside of the tube by a layer of vulcanized rubber or other protective coating to prevent it from sticking to the opposite tube wall when the tube was not inflated, but it has now been found that this coating reduced the effectiveness of the plastic layer in sealing puncture holes.

The demand for an effective bullet-resisting tube has increased in recent years because of the extensive mechanization of modern armies. The usual puncture-sealing tube with means for protecting only the tread portion of the tube affords little protection from punctures by bullets, since they are likely to enter or leave the tire through the sidewalls thereof or through the rim area.

A tube of the self-healing class having one or more layers of plastic material completely covering the inside of the tube (such as the tube shown in United States Patent No. 949,947) has given some protection against bullet punctures, but has not provided satisfactory puncture-sealing protection against large caliber bullets or machine gun bullets fired into and out of the covering tire casing through the tread portion thereof. The large caliber bullets make large holes in the tube when passing through it, and these large holes are imperfectly sealed by this type of tube, in which both the outer wall and the sealing layer are under tension when in use. Also, when a relatively long bullet of the machine gun type passes into the tube through the tread portion thereof and substantially in the plane of rotation of the vehicle wheel carrying the tube, the bullet tends to tumble within the tube's air chamber so that it thereafter strikes the tube wall with its side. A bullet so striking the inside tube wall and then continuing its journey out of the tube and tire leaves a large hole or jagged tear in the tire and tube, which cannot be completely sealed, in some cases, by the types of bullet-resisting tube heretofore developed.

It is, therefore, an object of the present invention to provide an inner tube for a pneumatic tire or other inflatable body effective in affording the body substantially complete protection from punctures, especially those caused by bullets, in the rim and sidewall areas as well as in the tread area.

Another object is to provide a puncture-sealing tube which combines the advantageous features of the compression and self-healing types of tubes.

Another object is to provide a corrugated puncture-sealing tube, the outer wall of which is designed to vent gas from between the tube and the mold during vulcanization of the tube and to strengthen the outer wall of the completed tube.

The above and further objects will be manifest in the detailed description of the invention presented hereinafter and in the accompanying drawings, in which:

Figure I is an enlarged section taken on line I—I of Figure II;

Figure II is a side elevation of a quarter section of one embodiment of the invention;

Figure III is an enlarged section taken on line III—III of Figure II;

Figure IV is a fragmentary transverse section through an assembly of a tire and rim and one embodiment of the improved tube mounted and inflated therebetween;

Figure V is a side elevation of approximately an eighth section of another embodiment of the invention; and Figure VI is a section taken on the line VI—VI of Figure V.

Similar numerals refer to similar parts throughout the several views.

Broadly, the invention comprises an inner tube for an inflatable object, such as a pneumatic tire or the like, the outer wall of which tube is corrugated so that the wall is placed under compression when the tube is inflated in the object. The corrugations preferably extend circumferentially around the tube. Preferably, the tube comprises protuberances positioned in the grooves between corrugations so as to form chains of protuberances, or a rib or corrugation, extending spirally, partially or completely around the tube. The corrugated tube may have an inner layer of a sticky sealing composition completely covering the inner surface of the outer wall or covering only that portion under the tube tread. A further feature of the invention resides in the fact that the sealing composition presents a corrugated surface to the outer wall of the tube and is placed under compression on inflation of the tube, whereby the composition immediately seals a puncture without the loss of appreciable air from the tube.

Referring especially to Figure I, it will be seen that one embodiment of the improved inner tube has its peripheral wall 1 provided with molded alternate grooves 2 and ridges 3 around the major portion of its transverse cross section, the ridges and grooves extending longitudinally circumferentially around the tube. Short protuberances 4 are positioned in the grooves 2 between successive ridges 3, in such manner that they form chains of protuberances spirally around the periphery of the tube. Preferably, a chain of protuberances extends in a partial spiral around the tube periphery, as shown in Figure II. The ridges 3 and protuberances 4 are preferably of substantially the same height, and each may carry a small rib 5 centered on the outermost portion thereof and extending the entire length of the ridge or chain of protuberances.

The protuberances or ribs 4, one of which is shown in Figure III partially in section and partially in perspective, are particularly effective, especially with the aid of the ribs 5, in venting the tube during the molding operation incident to the vulcanization of the tube and in venting the air from between the casing and the tube during inflation of the finished tube in actual use. The protuberances also have an important function in that they impart strength to the tube wall. The so-strengthened tube wall resists a distorting force even when the tube is uninflated, which characteristic is an advantage in storing and shipping the tube and in mounting the tube in a tire.

A preferred embodiment of the invention is shown in Figures I, II and III, and contains a thick puncture-sealing layer 6 for greatly increasing the effectiveness of the tube to seal a hole or tear made therein by a puncturing means, especially by a bullet. Preferably this layer 6 is a tacky rubber composition which possesses sufficient structure to resist flow and remain under compression during operation of a tire employing the tube, but which, at the same time, is very sticky, enabling it to adhere to a puncturing object, such as a nail, and fill up the puncture on withdrawal of the object. When a hole is made through the sealing layer by a puncturing object, such as a bullet, the hole is immediately sealed by the compressed layer expanding and sticking together. In the case of the common type of bullet-resisting tube, the tube walls were under tension and such hole was sealed effectively only by the flexing of the tube, which often required an appreciable period of time. However, in the case of the present corrugated bullet-resisting tube, the compressed tube wall immediately squeezes even a large hole shut, and any remaining hole is so small that there is required but little action by the sealing layer to seal the hole completely.

A suitable sealing composition layer results on vulcanizing a tube containing an inner layer of a special rubber composition containing softeners together with small amounts of a vulcanizing ingredient, a vulcanization accelerator, and a vulcanization retarder. The resulting sealing layer is tacky but is slightly vulcanized, so that it will not flow appreciably during the operation of a tire incorporating the tube, even at the high temperatures developing in such tire when it is run at high speeds. Thus the sealing layer is not subject to flow such as to result in thick and thin spots after extended use. The vulcanization of the sealing layer results in a tube wall which is still subject to elastic deformation, so as to avail the tube of the combined advantageous results of both the plastic-sealing and the compression sealing types of tubes.

The improved tube is provided with a suitable valve for inflating or deflating the same, which valve is preferably of the type indicated by the reference numeral 7 in Figures I and II when the tube includes a sealing layer 6 completely covering the inner surface of the wall 1. The valve 7, which may be made substantially of metal, carries a projection 8, preferably of rubber, for extending the air passage of the valve into the tube to a point substantially beyond the surrounding portion of the sealing layer 6. By means of the special valve the preferred form of tube shown in Figure I can be inflated or deflated with no danger of interference from the sealing layer.

The appearance of an embodiment of the improved tube when inflated in a tire is represented in section in Figure IV. Therein it is seen that the air pressure within the tube forces the tube wall 1 against the inner surface of the tire 9 and rim 10 to the extent that the corrugations of the tube disappear and the tube wall presents a relatively smooth surface to the contacting surfaces of the tire and rim. It follows that, with an improved tube of the proper size for the tire in which it is to be used, the tube wall, on inflation of the tube within the tire, will be somewhat compressed. In other words, the rubber in the tube wall, even more so than in the sealing layer, will be under a substantial compression, such that it will resist the passage therethrough of an ordinary sharp puncturing object and immediately close up a small puncture hole. The compressed tube wall will also tend to close a large hole or slit, such as one made by a bullet, when its effect is combined with the effect of the sealing layer 6 to aid in closing and completely sealing the large puncture.

Although the inflated tube presents a relatively smooth surface to the contacting surfaces of the tire and rim, the ribs 5 substantially retain their identity, as is shown in Figure IV.

The improved tube contains sufficient grooves 2 and ridges 3 to cause the rubber of the tube wall 1 to be under between about 2 per cent and about 8 per cent compression, and preferably under about 5 per cent compression, when the tube is inflated in a tire of the proper size. This preferred 5 per cent compression figure compares with the usual 14-35 per cent tension obtaining in the ordinary tube when inflated in a tire. The exact configuration of a specific type of the improved tube is arrived at by first determining the distance transversely around the periphery of any suitable tube mounted and inflated within the tire and on the rim to be utilized. This distance plus an increment of, preferably, 5 per cent, is the figure which represents the desired distance transversely around the uninflated corrugated tube, including the dips and rises of the grooves 2 and ridges 3. The tube is preferably designed to fit on a flat base rim, even though it is to be used on a drop center rim, such as is shown in Figure IV. The reason for this preference resides in the observation that, when the tube is used on a drop center rim the uncorrugated portion of the tube wall next to the rim will expand into the rim well when the tube is inflated, thereby leaving an unwanted excess of the tube wall to expand against the tire. Of course, if the corrugations extend completely around the tube, this preference in designing is not applicable, as the corrugations will then tend to fill out the rim well in the same manner that they fill the tire.

In order for the compressing action of the longitudinal circumferential corrugations to be entirely effective, it is preferred that the tube be so designed that it does not stretch appreciably circumferentially when inflated in a tire and thus tend to counteract the transverse compression obtained. Thus, it is preferred that the greatest circumference of the tube be substantially equal to the greatest circumference on the inside of the corresponding tire casing. The tube circumference can be slightly greater than the inside circumference of the tire and, thus, enhance the compression of the tube walls; however, this is not necessary and renders difficult the mounting of the tube in the tire.

A modified form of tube is shown in partial side elevation in Figure V. This embodiment of the invention is similar to that shown in Figure II in having several spiral chains of protuberances 4 encircling the tire-engaging portions of the tube periphery. This form of the tube additionally carries short chains of protuberances 4a, 4a, positioned between the spiral chains 4 and extending from the rim-engaging portion of the tube periphery across each sidewall of the tube to the tread portion thereof. This construction effects a further strengthening of the tube sidewall and is especially advantageous in that embodiment of the invention wherein a puncture-sealing layer is positioned only on the inner surface of the tread portion of the tube, as is shown in Figure VI.

Figure VI, a section taken on line VI—VI of Figure V, represents an embodiment of the invention having a sealing layer 6a covering only the inner tread portion of the tube wall 1. This type of tube is eminently suited for general civilian use as a puncture-sealing tube, since only the tread portion of the tube normally is subject to puncture.

When no inner sealing layer is to be incorporated in the improved tube, it is readily manufactured by vulcanizing a conventional green tube of the proper size and preferably with a heavy gauge wall in a suitable mold to produce the reinforced corrugations on the finished tube, as shown in Figure I, II or V.

When the improved tube is to contain a puncture-sealing inner layer, the final molding operation is the same, but the green tube must be especially fabricated. A tube having the green sealing composition only under the tread thereof may be built on a mandrel or on a drum, according to the disclosure of United States Patent No. 1,992,514. When the tube is to have the sealing layer completely covering the inner tube wall, either method of the said patent may be employed, obvious modifications being made to handle the different construction.

A tube of the type shown in Figure I, embodying the preferred puncture-sealing composition, may be constructed on a mandrel in a different manner from that of the said patent. First, a heavy gauge sheet of the preferred type of green sealing composition is rolled around the mandrel to form a tube, which is then covered by a sheet of ordinary tube composition. Since the green sealing composition is no more tacky than an ordinary uncured rubber composition, it does not stick to the mandrel, and the composite tube may readily be slipped therefrom and spliced.

The improved tube is of simple construction and can be cheaply and rapidly produced, after the mold is provided. When no inner sealing layer is utilized, the tube is effective in resisting puncture and in temporarily sealing small puncture holes. When a complete inner layer of sealing composition is incorporated in the tube, large punctures, even those made by large bullets, are immediately and completely sealed. Especially, when the preferred type of rubber sealing layer is used within the improved tube, the result is a puncture-sealing and bullet-resisting tube of highest efficiency and reliability.

What is claimed is:

1. A puncture-sealing inner tube for an inflatable object, which tube comprises a peripheral wall embodying longitudinal circumferential corrugations, protuberances positioned in said corrugations and forming ribs extending at least partially around the periphery of the tube, the distance transversely around the periphery of the uninflated tube being about 5 per cent greater than the effective distance transversely around the periphery of the tube when the same is normally inflated within the corresponding inflatable object, the greatest longitudinal circumference of the inflated tube being substantially equal to the greatest longitudinal circumference on the inside of said inflatable object, and an elastic, tacky vulcanized rubber composition sealing layer completely covering the exposed inner surface of said peripheral wall and filling the channels and depressions on the inside surface of the tube beneath said corrugations and protuberances when said tube is uninflated, said sealing layer presenting a tacky surface to the body of gas contained within said tube.

2. A puncture-sealing inner tube for an inflatable object, which tube comprises a peripheral wall embodying longitudinal circumferential corrugations, protuberances positioned in said corrugations, certain of which protuberances form chains extending in partial spirals around the tube and certain others of said protuberances form shorter chains parallel to said spirals and lying between said spirals and extending only from the rim-engaging portion of said peripheral wall to the tread portion thereof, and narrow solid ribs positioned along the ridges of said corrugations and the ridges of said protuberances, an elastic, tacky vulcanized rubber composition sealing layer positioned on the inner surface of said peripheral wall and covering at least that portion of the inner surface beneath the tread of the tube, said sealing layer presenting a tacky surface to the body of gas contained within said inner tube.

3. A puncture-sealing inner tube for an inflatable object, which tube comprises a peripheral wall embodying longitudinal circumferential corrugations, protuberances positioned in said corrugations and forming a chain extending at least partially around the periphery of the tube, narrow solid ribs positioned along the ridges of said corrugations and the ridges of said protuberances, and an elastic, tacky vulcanized rubber composition sealing layer completely covering the exposed inner surface of said peripheral wall, said sealing layer presenting a tacky surface to the body of gas contained within said inner tube.

4. A puncture-sealing inner tube for an inflatable object, which tube comprises a peripheral wall embodying longitudinal circumferential corrugations, protuberances positioned in said corrugations and forming a chain extending at least partially around the periphery of the tube, and narrow solid ribs positioned along the ridges of said corrugations and the ridges of said protuberances, the distance transversely around the periphery of the uninflated tube being between 2 and 8 per cent greater than the effective distance transversely around the periphery of the tube when the same is normally inflated within the corresponding inflatable object, the greatest longitudinal circumference of the uninflated tube being substantially equal to the greatest longitudinal circumference on the inside of said inflatable object, and an elastic tacky vulcanized rubber composition sealing layer completely covering the exposed inner surface of said peripheral wall and filling the channels and depressions on the inside surface of the tube beneath said corrugations and protuberances when said tube is uninflated, said sealing layer presenting a tacky surface to the body of gas contained within said tube.

ROBERT F. WILSON.